US008511242B2

(12) United States Patent
Applegate et al.

(10) Patent No.: US 8,511,242 B2
(45) Date of Patent: Aug. 20, 2013

(54) SEED METER CONTROL

(75) Inventors: Doug Applegate, Oakland, IA (US); Luke Applegate, Oakland, IA (US); Brent Applegate, Emerson, IA (US)

(73) Assignee: Agtelligent, LLC., Oakland, IA (US)

( * ) Notice: Subject to any disclaimer, the term of this patent is extended or adjusted under 35 U.S.C. 154(b) by 248 days.

(21) Appl. No.: 12/587,048

(22) Filed: Oct. 1, 2009

(65) Prior Publication Data
US 2011/0232549 A1    Sep. 29, 2011

(51) Int. Cl.
*A01C 17/00* (2006.01)
*A01C 15/04* (2006.01)

(52) U.S. Cl.
USPC ........... 111/176; 111/185; 111/200; 111/900; 701/50

(58) Field of Classification Search
USPC ................. 111/183–185, 177, 170, 174–176, 111/200, 900; 701/50
See application file for complete search history.

(56) References Cited

U.S. PATENT DOCUMENTS

| | | | |
|---|---|---|---|
| 4,779,471 A | 10/1988 | Rettig | |
| 4,872,785 A | 10/1989 | Schrage et al. | |
| 5,170,909 A | 12/1992 | Lundie et al. | |
| 5,231,940 A | 8/1993 | Tjeerdama | |
| 5,265,547 A | 11/1993 | Daws | |
| 5,431,117 A | 7/1995 | Steffens et al. | |
| 5,740,747 A | 4/1998 | Stufflebeam et al. | |
| 5,765,720 A | 6/1998 | Stufflebeam et al. | |
| 5,848,571 A | 12/1998 | Stufflebeam et al. | |
| 6,003,455 A | 12/1999 | Flamme et al. | |
| 6,024,035 A | 2/2000 | Flamme | |
| 6,192,813 B1 * | 2/2001 | Memory et al. | 111/176 |
| 6,269,758 B1 | 8/2001 | Sauder | |
| 6,386,128 B1 | 5/2002 | Svoboda et al. | |
| 6,708,080 B2 | 3/2004 | Benneweis | |
| 6,718,891 B1 | 4/2004 | Burbage, Jr. et al. | |
| 6,742,465 B2 * | 6/2004 | Crabb et al. | 111/185 |
| 6,832,567 B2 | 12/2004 | Carr et al. | |
| 6,863,006 B2 | 3/2005 | Sandova et al. | |
| 6,877,675 B2 | 4/2005 | Benneweis | |
| 7,152,542 B2 | 12/2006 | Eben et al. | |
| 7,228,807 B1 | 6/2007 | VenHuizen | |
| 7,237,495 B2 | 7/2007 | Harnetiaux | |
| 7,374,030 B1 | 5/2008 | Dillman | |
| 2005/0150442 A1 | 7/2005 | Friesen | |

FOREIGN PATENT DOCUMENTS

EP           0309608 A2 *   4/1989

* cited by examiner

*Primary Examiner* — Christopher J Novosad
(74) *Attorney, Agent, or Firm* — Camille L. Urban

(57) ABSTRACT

A seed metering apparatus having a selectably actuated panel positioned between the metering apparatus and discharge chute, the panel moving between an open position and a closed position such that seeds may be more accurately spaced and metered without disrupting the drive mechanism of the seed metering apparatus. A seed metering apparatus where metered but non-discharged seeds are returned to a seed reservoir for subsequent metering and planting.

17 Claims, 12 Drawing Sheets ly. More specifically, the invention relates to an apparatus that provides precise and reliable regulation of seed placement without disrupting the operation of a conventional seed meter.

SEED METER CONTROL

CROSS-REFERENCE TO RELATED APPLICATIONS

None

BACKGROUND OF THE INVENTION

1. Field of the Invention

The present invention relates generally to seed metering mechanisms for planters. Specifically, the invention relates to a seed metering apparatus that regulates and restricts the unintended dispensation of seeds thereby minimizing the waste or loss of seed and increasing the precision of seed placement. More specifically, the invention relates to an apparatus that provides precise and reliable regulation of seed placement without disrupting the operation of a conventional seed meter.

2. Description of the Prior Art

Mechanical seed meters are well known in the art, as are seed meters that operate under a vacuum all of which have the objective of ensuring that seeds are singularly dispensed. These meters, however, while useful for their intended purpose do not optimally control and regulate discharge of seeds to the degree necessary for efficient and precise farming operations. The general structure of a seed meter includes a seed well to keep seeds and a seed plate comprising openings and working in conjunction with a vacuum to associate seeds from the seed well with the openings. Usually the openings are near the seed plate's perimeter which is typically circular. The plate is rotated through the seed well and then around to a discharge chute where the vacuum pressure is removed and the force of gravity urges the seed's discharge either directly onto the ground or indirectly via a chute and/or seed tube. There is no opportunity to stop mid-pathway once the seed is discharged from the seed plate. Hence, it is incumbent on the operator to precisely time the shut-down of the seed meter with the speed and stopping distance of the tractor at the end of a planting row or upon encountering a planting border or other obstacle. Without appropriate timing, the meter is likely to double plant or skip.

If a conventional seed meter is shut down while an implement is still in motion, a number of seeds may still be dispensed. This happens because although the drive mechanism is interrupted, it is common for seed plates to rotate up to an additional ⅙ of a complete rotation (~60°) thereafter the exact degree of extra rotation depends on such factors as speed, gearing, clutch operation, row-shutoff mechanism, etc. By design, a rotating seed plate will continue to dispense seeds according to its mode or mechanism of operation therefore resulting in multiple simultaneously discharged seeds. Upon restarting movement following a shut-down, the seed plate must be primed by spinning to refill; seeds can be discharged during this process. Skips or blanks i.e. a space where a plant should grow but does not because no seed was planted may occur if the seed plate is not appropriately constructed both to agitate the seed mass which assists the seeds to become associated with the plate via the vacuum pressure, and to adequately hold seeds in place on the plate.

Many seed meters' mechanisms depend on air clutches and air compressors. These clutches and compressors are prone to failure under the conditions typical for seed meters. Specifically, dirt, dust and moisture create a situation where air clutches and compressors become less and less reliable.

The price of seed and the growth inefficiencies represented by the lack of control inherent in most conventional seed meters would probably have gone unnoticed fifteen or twenty years ago, but today's farmer cannot afford to ignore this issue. Genetically modified and other specially bred seeds are very expensive. Further, the application of herbicides and pesticides add to the expense and can be controlled to very minute degrees. However, having such control over and understanding of specific application rates of fertilizers or chemicals can be negated by double plantings or irregular spacing of plants. Any time seeds are wasted or chemicals are over or under applied represents a change in income for agricultural operators.

A need exists for an improved seed meter that selectively and precisely controls the dispensation of seed at the control of an operator. A further need exists for an improved meter that conserves any metered and released but un-discharged seeds and returns them to a seed reservoir or container for subsequent metering and planting. Meters that more dependably meter seeds would be advantageous. Finally, it would be desirable to accomplish these goals in a manner that does not increase maintenance requirements and downtime.

SUMMARY OF THE INVENTION

It is therefore a first objective of the present invention to provide a seed meter that reduces the incidence of double planting, unwanted seed discharge, uneven spacing of plants caused by skips or doubles, and reduces seed damage;

It is a second objective of the present invention to provide a means to retrofit existing seed meters in an easy and affordable manner to achieve the first objective;

It is a third objective to provide a seed plate constructed to improve accuracy in planting;

It is a fourth objective of the present invention to provide a simple and durable mechanism for stopping discharge of seed without stopping the drive mechanism of the seed meter;

It is a fifth objective of the present invention to provide a means of controlling the mechanism for stopping discharge of seed that can withstand the conditions in which the seed meters must work.

The present invention relates to an improved seed meter having a selectably actuated panel or door positioned between the metering apparatus and discharge chute. The door is moved between an open position and a closed position. When the door is in closed position the seeds that have already been released from or positioned by a seed plate are prevented from discharge. Changing the door's position is not dependent on the seed plate's position nor does it effect the drive mechanism of the meter or the movement of the seed plate.

In a preferred embodiment, the seed plate is constructed to include two rows of holes near the perimeter of the plate, each hole in each pair oriented generally radially from the other. This arrangement provides excellent agitation of the seed mass which is necessary to create an environment where a seed can be positioned at every hole. Further, in this arrangement if a seed on an inside hole (the seed that will be planted) becomes prematurely dislodged, the seed exterior to it moves to the empty hole to be planted. The remaining seeds positioned on exterior holes are returned to the seed mass. Testing of other seed meters showed that meters metering difficult seed have an error rate of 35 per 1000 seeds. Replacing the factory plate with the seed plate of the present invention reduced that rate to 11 per 1000. When employed with easily metered seed, the rate dropped to 4 per 1000.

The present invention includes a feature to protect seed from possible damage that may result if a seed is caught in the door and to keep other seed from leaking around a trapped seed. Specifically, a flexible door may be employed so that it flexes around the trapped seed thereby barring exit of other seed. If an electric motor is used to move the door, then a spring can be associated to allow full actuation of the motor but reduced pressure on the trapped seed. Alternatively, power to the motor could be controlled to determine the end of the stroke.

One feature of the invention is that seeds prevented from discharge will be conserved automatically and returned to a seed reservoir, preferably an existing and integral one, for subsequent metering and planting. A second feature is that the operator can stop the dispensation of seeds nearly instantaneously from the cab of a tractor without disengaging the drive mechanism of the meter. A third feature is that plant spacing will be highly regulated and, in turn, the effectiveness of herbicides, fertilizers and pesticides improved. The fourth feature, resulting from the previous three, is improving overall efficiency of the farming operation.

Other features and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED AND OTHER EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

Figure 1:
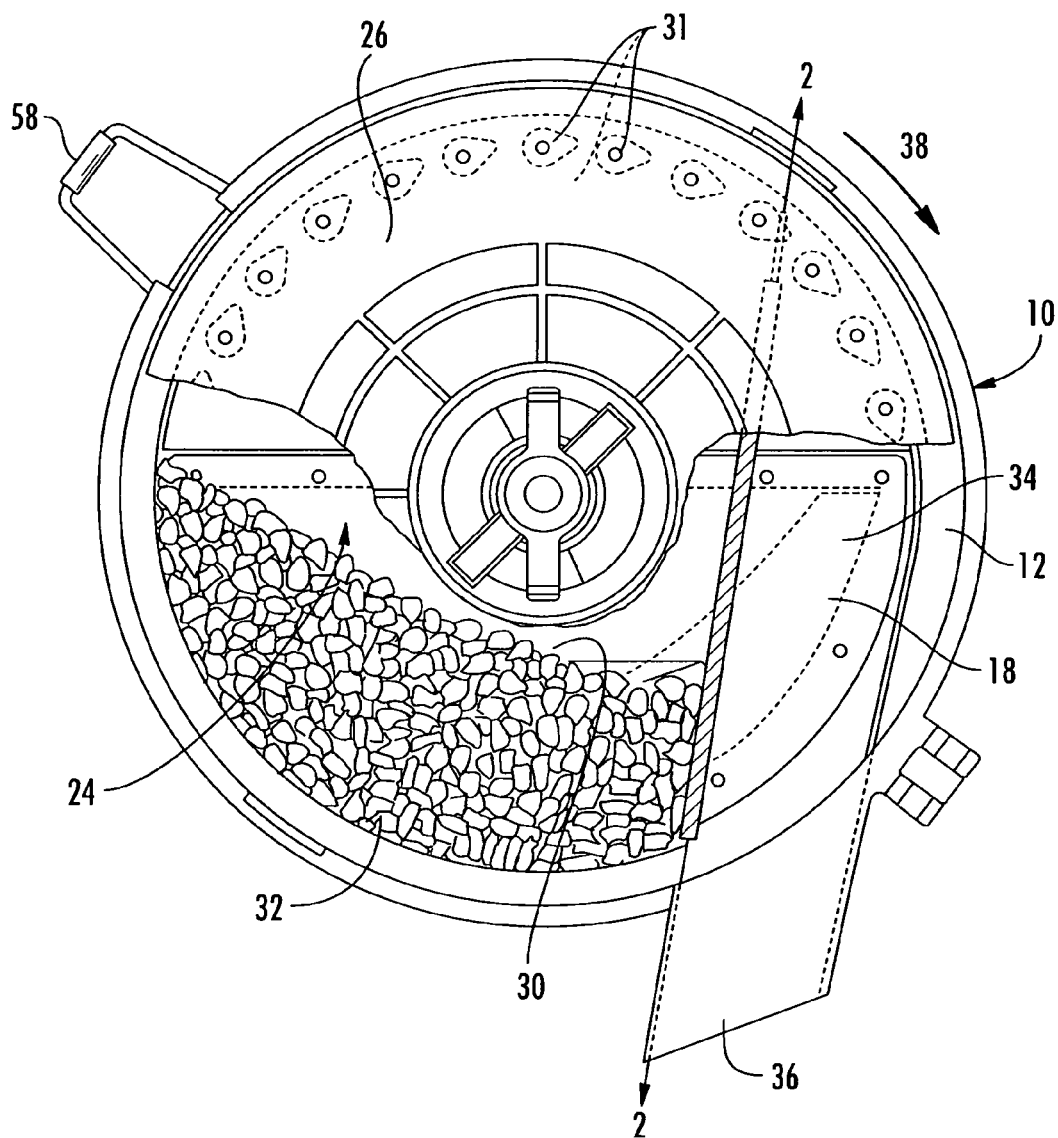
FIG. 1 is a side view of a first prior art vacuum seed meter with the vacuum cover removed.
Figure 2:
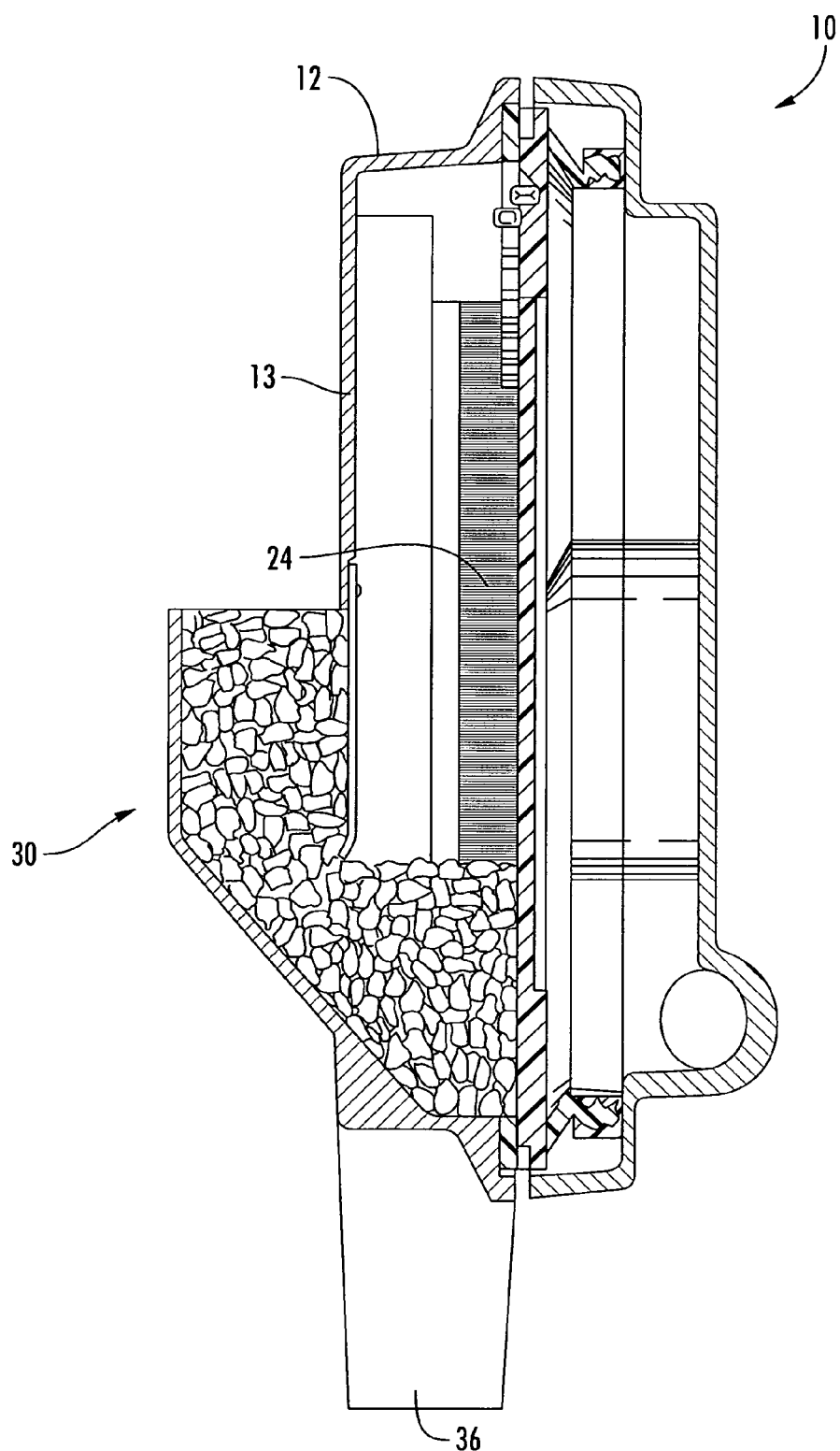
FIG. 2 is a cut away along line 2-2 of FIG. 1 of the first prior art vacuum seed meter.
Figure 3:
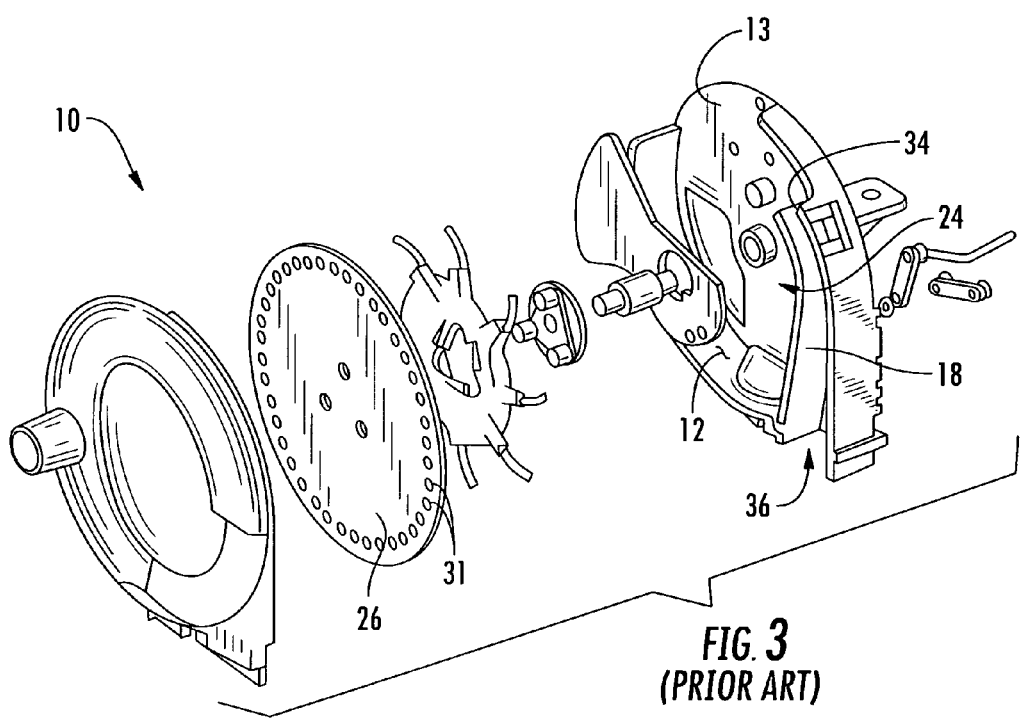
FIG. 3 is a perspective exploded view of a second prior art vacuum seed meter.
Figure 6:
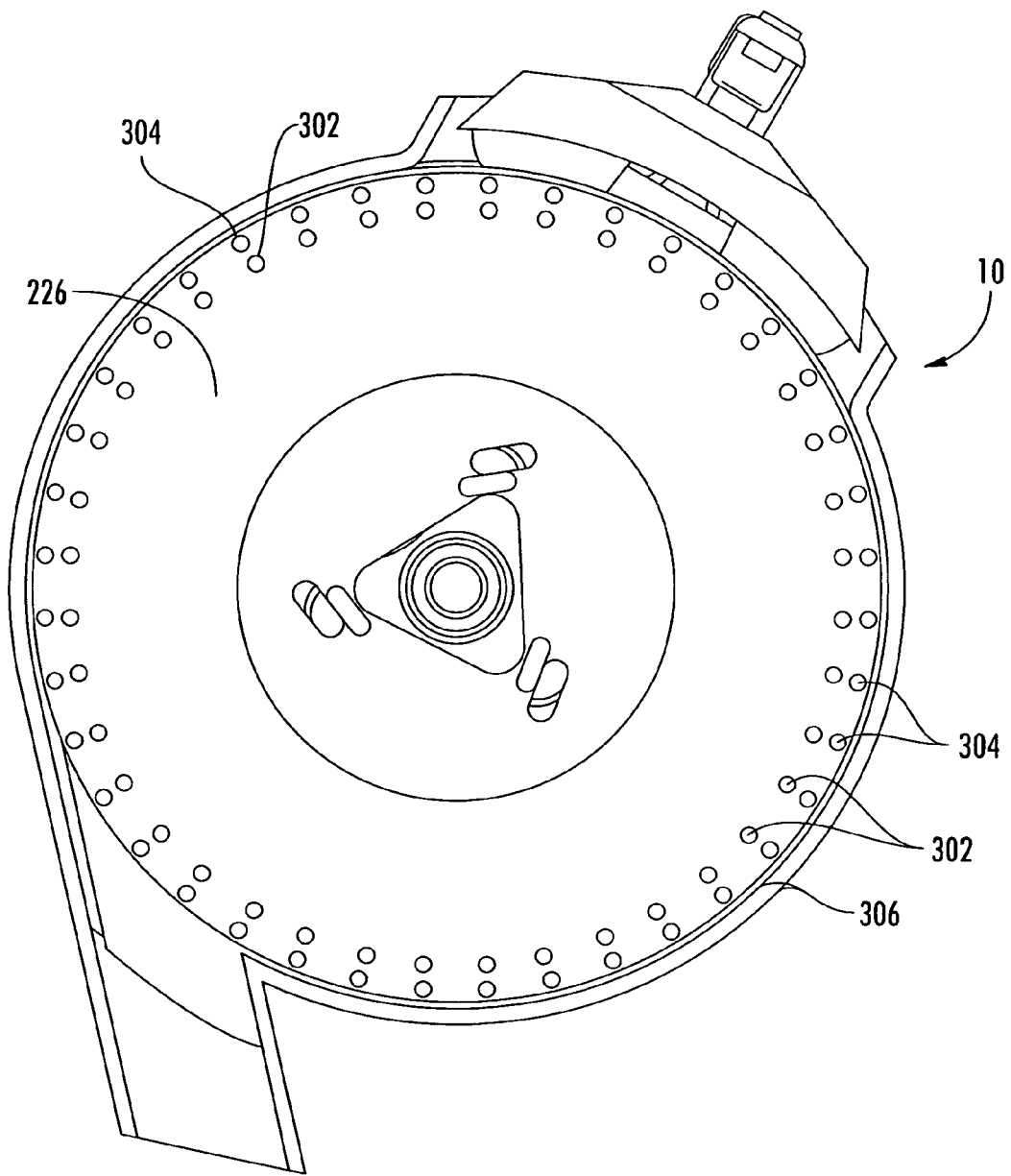
FIG. 6 is a first side view of a first embodiment of the seed meter and seed plate of the present invention with the vacuum cover removed.
Figure 7:
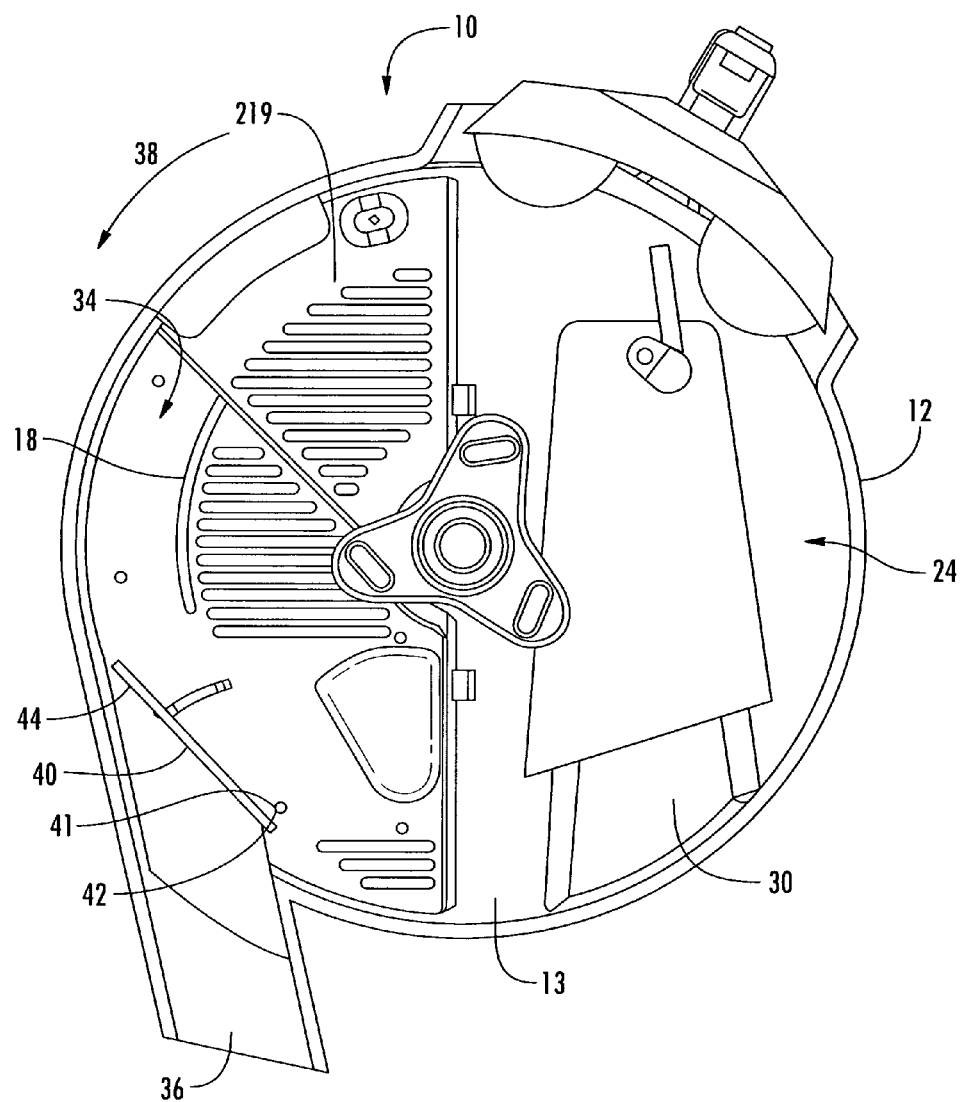
FIG. 7 is a view of the seed meter of FIG. 6 with the seed plate removed.

In FIGS. 1 and 2, a first conventional prior art vacuum seed meter 10 as disclosed in U.S. Pat. No. 5,170,909 to Lundie et al. (assigned to Deere and Company)); in FIG. 3 a second prior art seed meter 10 as disclosed in U.S. Pat. No. 5,740,747 to Stufflebeam et al. (assigned to Case Corporation); each referenced patent incorporated herein by reference. Meter 10 comprises a housing 12, and occasionally an internally disposed wall 18. A metering chamber 24 is substantially defined within said housing 12 which further comprises a back cover 13. Metering chamber 24 comprises a seed plate 26 having openings 31 and a seed reservoir 30. Seed plate 26 is rotatably disposed such that a portion of it rotates within metering chamber 24. Seed reservoir 30 contains seeds 32. The seeds 32 are drawn under vacuum into the openings 31 about seed plate 26 as the openings 31 are rotated through the seed reservoir 30 via mechanisms that are well known in the art. FIG. 6 shows a first side view of the seed meter 10 of the present invention with the vacuum cover removed so that the seed plate 26 and openings 31 are shown.

As shown in FIGS. 1-3 and FIG. 7, meter 10 further comprises a passage 34. A first end of passage 34 is in open communication with metering chamber 24. At its opposite end, passage 34 terminates in a discharge chute 36. Passage 34 and discharge chute 36 cooperate as the route by which seeds 32 exit meter 10. Persons skilled in the art will appreciate that discharge chute 36 may not be separable, or physically distinct or distinguishable from passage 34 but "discharge chute" as used herein may simply represent the terminal region or terminus of passage 34 or an opening through which seeds move.

Figure 8:
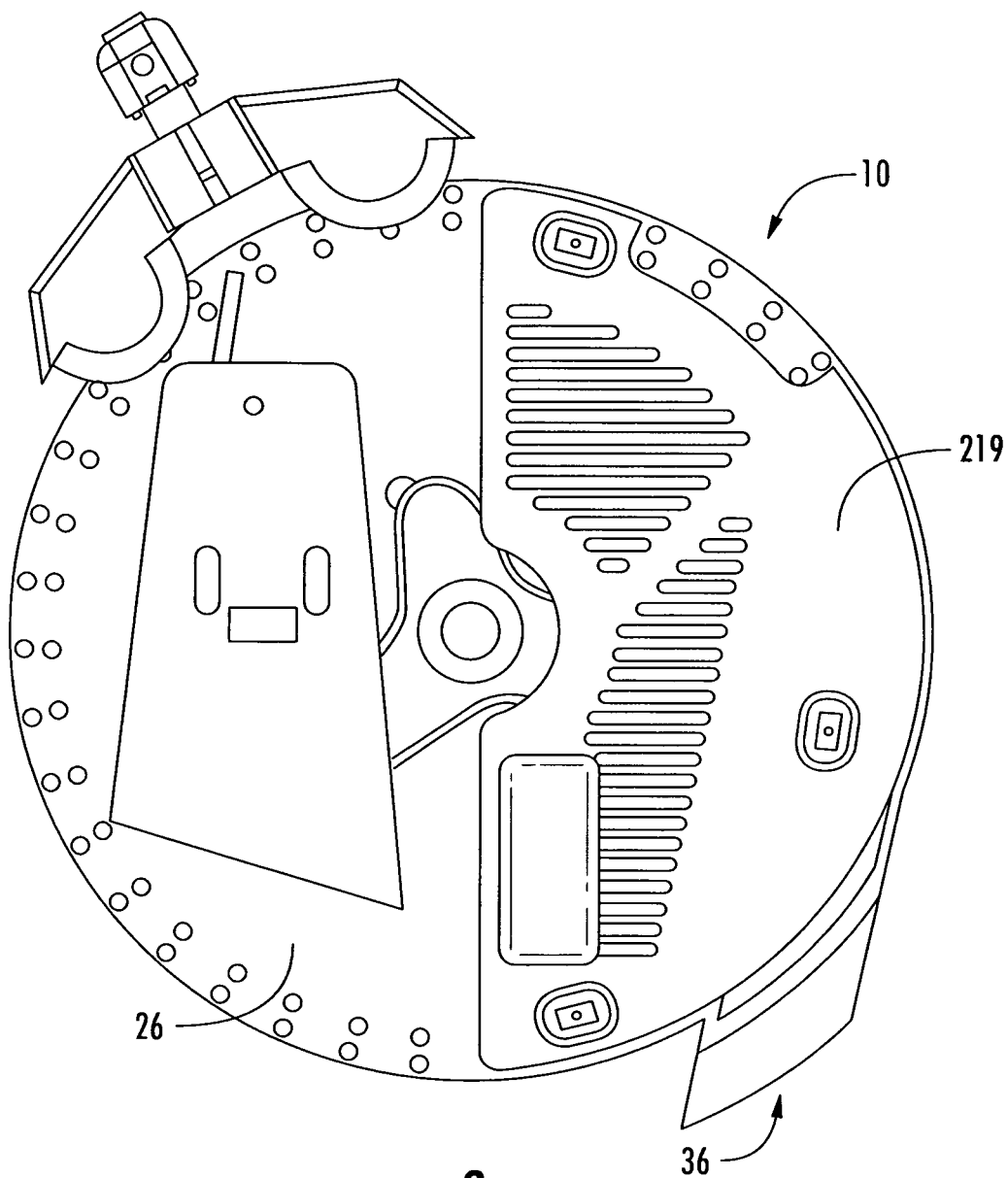
FIG. 8 is a second side view of the seed meter of FIG. 6 with the back cover removed.

In operation, as is well known in the art, seed 32 is metered, guided under vacuum, and eventually released by seed plate 26 proximate the first end of passage 34 before passing from metering chamber 24 to passage 34 in the direction of arrow 38. Seed 32 is ultimately dispensed or discharged out of passage 34, usually via discharge chute 36. In some embodiments, seeds are discharged from meter 10 into a seed tube (not shown) positioned below discharge chute 36. FIG. 8 shows the second side view of the seed meter of FIG. 6 with the back cover 13 removed.

Turning to FIGS. 6, 7, 9 and 10, in a first embodiment of the improved seed meter apparatus disclosed herein, wall 18 of meter 10 comprises a means for altering seed flow 40 (which, in the preferred embodiment comprises a panel but may be an object of any size, shape, or material capable of stopping the flow of seed) and means to associate 41 said means for altering seed flow 40 proximate said discharge chute 36. Preferably said means to associate comprises hingedly 41 attaching the panel 40 at a first end 42 proximate discharge chute 36 of passage 34. As used herein, "hingedly" refers to the use of a hinge or a similar structure. As is well known, this hinge may be made of a flexible material or a living hinge, or may comprise moving components that rotate relative to one another and/or pivot about a fixed axis of rotation. For example, certain known hinges feature one or more hinge plates attached to the moving component(s) by screws and rotatable about a hinge pin.

A conventional meter 10 may be modified under the present disclosure by removing all or a part of wall 18 and replacing the same with said means for altering seed flow 40. In the preferred embodiment, the panel 40 of wall 18 is preferably facing, contiguous with or adjacent to seed reservoir 30. Panel 40 will preferably represent a portion of wall 18, but in some instances it may be desirable for panel 40 to replace substantially all or all of wall 18. Panel 40 may optionally be constructed of the same material as wall 18 and may optionally even be that very portion of wall 18 physically removed and modified at its first end 42 to be hingedly attached to meter 10 as described.

Figure 9:
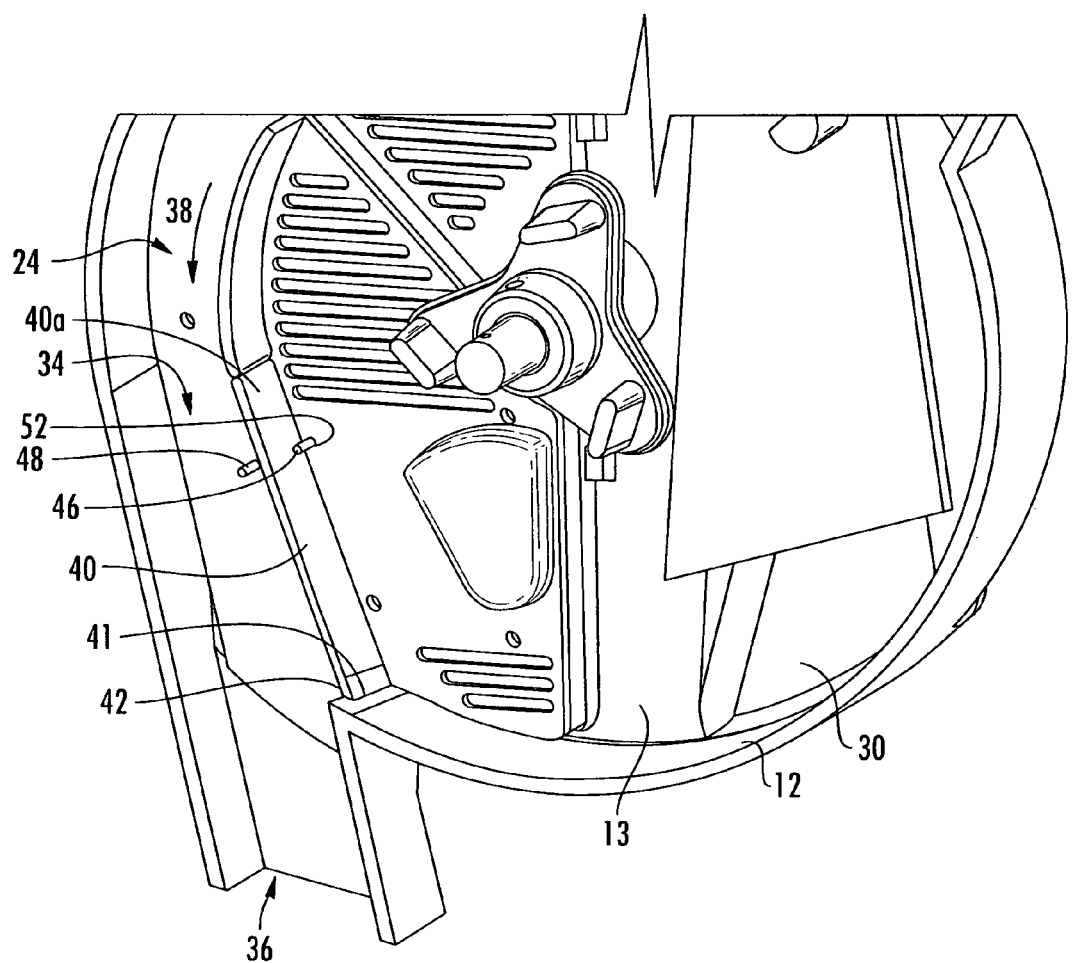
FIG. 9 is a perspective, close up view of the area of FIG. 7a showing a first embodiment of the present invention in a closed position.
Figure 10:
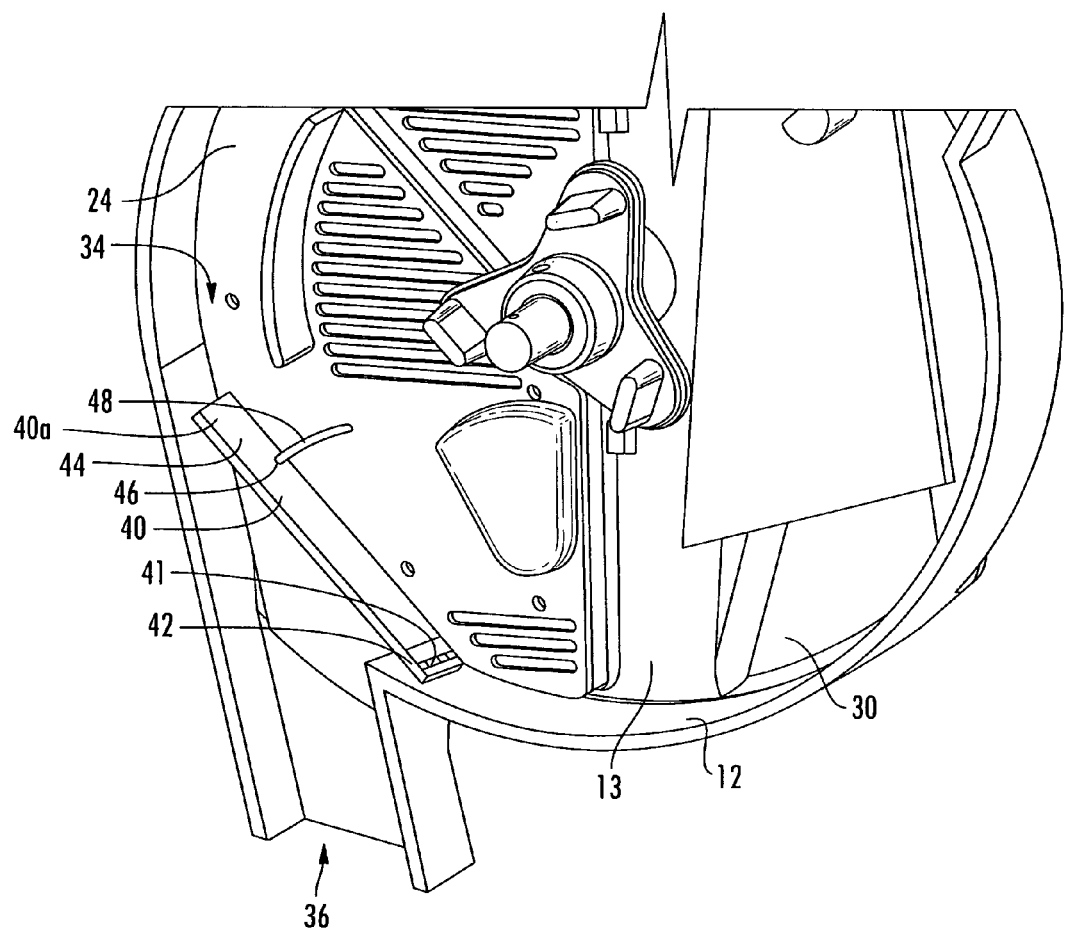
FIG. 10 is a perspective close up view of the area of FIG. 7a showing the first embodiment of the present invention in an open position.

A second end 44 of panel 40 may comprise an anchor 46 in communication with an actuation means 48. Actuation means 48 is preferably an electric gear motor but may be any device or structure capable of selectively opening and closing said means for altering seed flow 40 which, in the Figures is represented as panel 40 opening and closing about its hinged first end 42. Actuation means 48 (FIGS. 9 and 10) may act directly on the hinge 42 or directly or indirectly on panel 40 via anchor 46. Anchor 46 may be any attachment or engagement such as a rivet, bolt, hook or clip, whereby panel 40 is operably connected to actuation means 48. Anchor 46 may be in communication with actuation means 48 via intermediate attachment 50 best shown in FIGS. 11 and 12. Attachment 50 may in turn be any number of preferably rigid attachments, including bolts, screws, chains, rods, pistons, levers and the like. As shown in FIGS. 9 and 10, actuation means 48 may pass through an opening 52 in the back cover of housing 13 of meter 10. Actuation means 48 or 148 (FIGS. 11 and 12) is preferably located external to meter 10 but may be situated in close proximity to attachment 50.

As depicted in FIG. 9 panel 40 is in an open position, whereby panel 40 forms an integral part of (or alternatively, all of) wall 18 and defines a physical barrier between metering chamber 24 and passage 34. Seeds 32 released by meter 10 will travel in the direction of arrow 38 and exit passage 34 via discharge chute 36.

FIG. 10 shows panel 40 in a closed position, whereby panel 40 defines a physical barrier between passage 34 and discharge chute 36 such that a seed released by meter 10 will travel into passage 34 via direction of travel 38 but return to metering chamber 24, preferably into seed reservoir 30.

Persons skilled in the art will appreciate that means for altering seed flow 40 may need to be positioned and or shaped to account for the internal dimensions and/or shape of passage 34. For example, if passage 34 is roughly trapezoidal in cross-section, means for altering seed flow 40 will need to be associated with said housing 12 at an angle that is not perpendicular to the back of housing 12.

Figure 4:
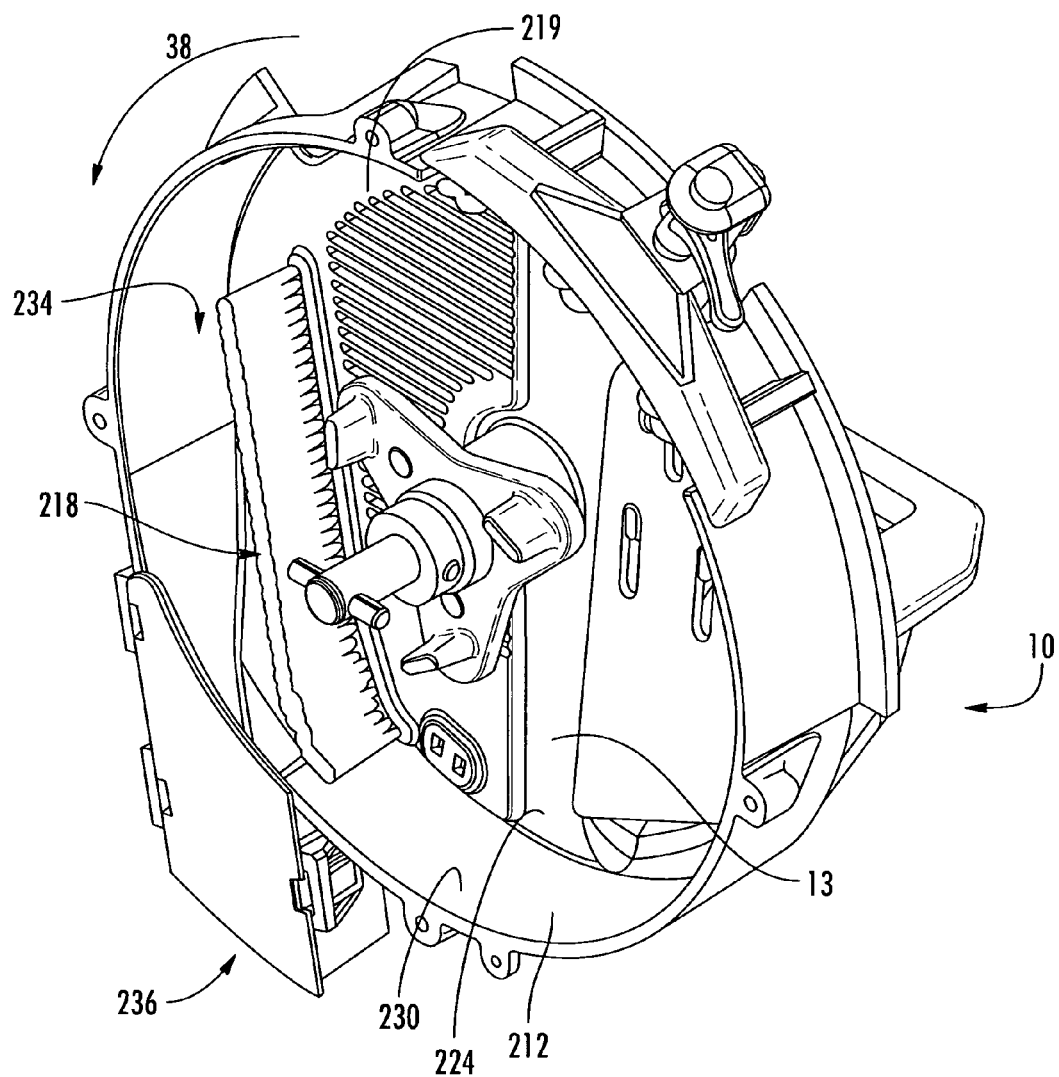
FIG. 4 is a perspective view of a third prior art vacuum seed meter with the vacuum cover and seed plate removed.
Figure 5:
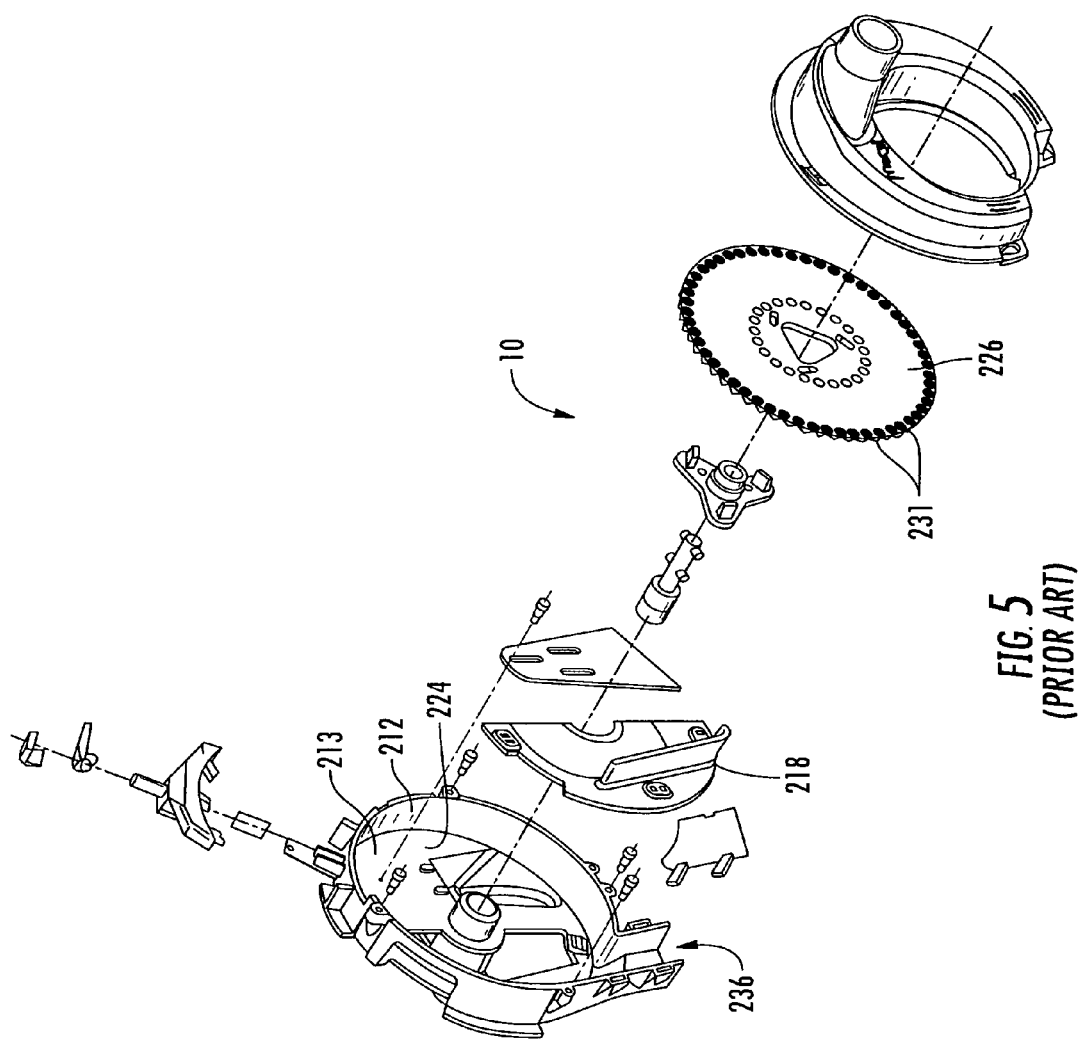
FIG. 5 is a perspective exploded view of the third prior art vacuum seed meter including the vacuum seed cover.

Depicted in FIGS. 4 and 5 is the third prior art seed meter as disclosed by U.S. Pat. No. 7,152,542 to Eben et al. and incorporated herein by reference. This prior art device features a housing 212 and an internally disposed elongate brush 218. A metering chamber 224 is substantially defined by housing 212 and brush 218. Metering chamber 224 further comprises a seed plate 226 and a seed reservoir 230. Seed reservoir 230 contains seeds. Seed plate 226 is rotatably disposed within metering chamber 224, and may be characterized by seed pockets, fins or other structures (not shown). Positioned roughly tangential to metering chamber 224 is passage 234. A first end of passage 234 is in open communication with metering chamber 224. At its opposite end, passage 234 terminates in a discharge chute 236. Passage 234 and discharge chute 236 cooperate as the route by which seeds 232 exit meter 210. Persons skilled in the art will appreciate that chute 236 may not be separable, or physically distinct or distinguishable from passage 234 but may simply represent the terminal region or terminus of passage 234.

Figure 11:
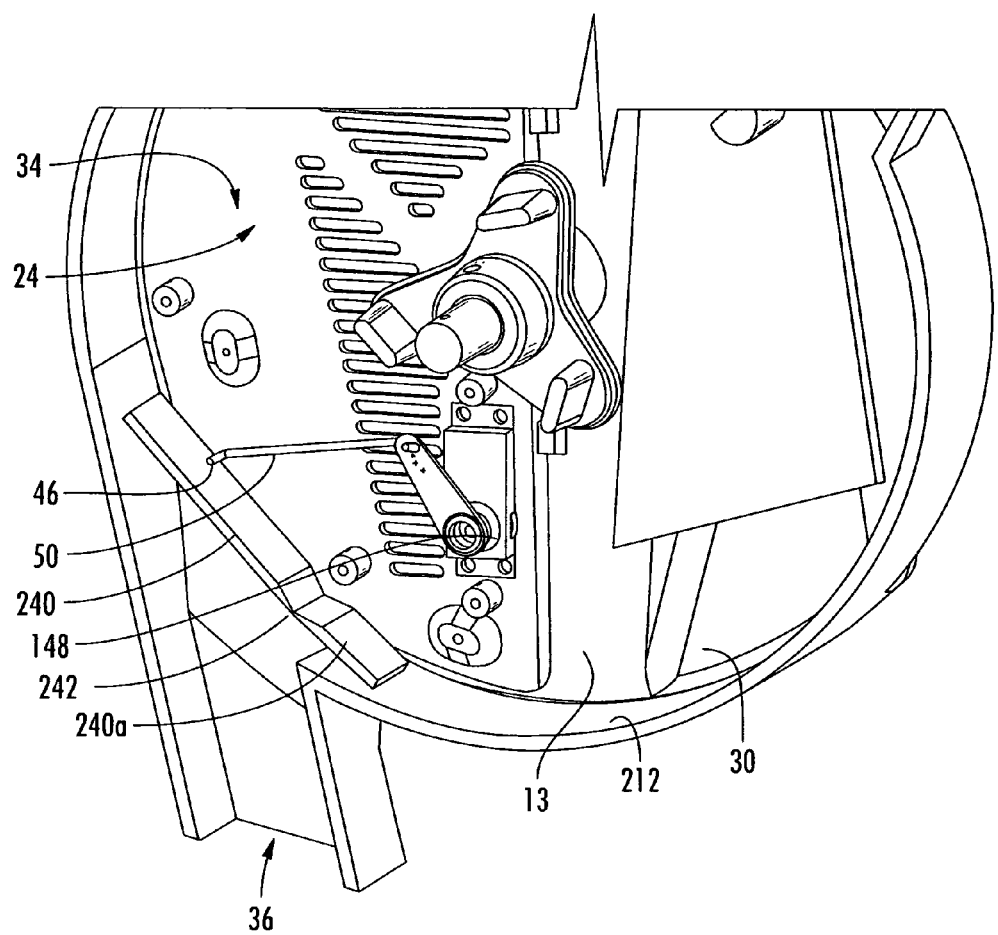
FIG. 11 is a perspective close up view of the area of FIG. 7a showing a second embodiment of the present invention in a closed position employed with the third prior art seed meter shown in FIGS. 4 and 5.
Figure 12:
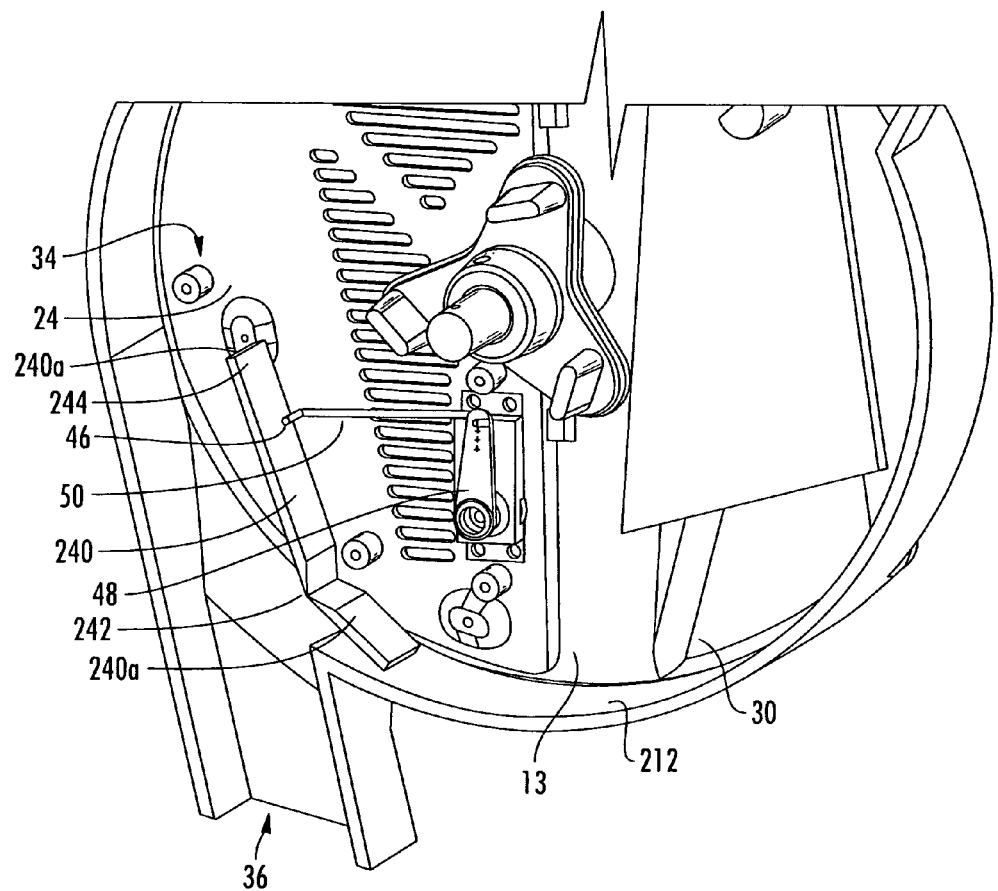
FIG. 12 is a perspective close up view of the area of FIG. 7a showing the second embodiment of the present invention in an open position employed with the third prior art seed meter shown in FIGS. 4 and 5.

An embodiment of the apparatus of the improved seed meter as applied to the meter shown in FIGS. 4 and 5. is depicted in FIGS. 11 and 12. It will be appreciated that at least a portion of brush 218 of the prior art device shown in FIGS. 4 and 5 has been removed and replaced with a panel 240. Brush 218 may be, in total or in part, removable from conventional meter 210, but this is not necessary as even a fixed structure may be removed by means known in the art. Optionally, panel 240 may be fitted with a flange 254 that acts as a seed guide and would engage seeds 232 in order to remove them from seed plate 226 as seed plate 226 rotates past panel 240. Flange 254 is preferably shaped as shown.

Panel 40 may be configured as in FIGS. 9 and 10 or alternatively may comprise a living hinge 242 at a proximal end 240a and panel 240, and hingedly attached to hinge 242 is door 244. It will be appreciated that door 244 is movable, while the remainder of panel 240 is fixed relative to housing 12.

As depicted in FIG. 11, panel 240 and door 244 are in open position whereby passage 34 remains in open communication with metering chamber 24. FIG. 12 shows panel 240 and door 244 in a closed position, whereby panel 240 and door 244 define a physical barrier between metering chamber 24 and passage 34.

A preferred embodiment of the seed plate 226 may also be employed to further enhance the efficacy of the apparatus of the improved seed meter. In FIG. 6, the improved seed plate 226 is generally flat and comprises circumferentially spaced and generally radially aligned pairs of openings 302 (interior) and 304 (exterior) near the plate's perimeter 306. The presence of two generally radially aligned openings 302, 304 improves the efficacy by reducing skips and increasing the rate of singulation. The presence of the second opening 304 increases agitation of the seed mass as the seed plate 226 passes through the seed reservoir 30 therefore improving original adherence of seeds to openings 302, 304. Further if a seed is dislodged from the interior opening 304 prematurely, this construction results in the movement of the seed from the outside opening 302 to the interior opening 304.

Yet another embodiment of the seed meter would include a panel hingedly attached to the back cover. The panel is further in operable connection with an actuation means. Alternatively, the panel may be slidably engaged with the back cover such that the panel may sled between a first and second position.

Panel (40, 240) may comprise an anchor in communication with an actuation means 48 which is preferably an electric gear motor but may be any device or structure capable of selectively opening and closing the panel about its engagement. The panel 40, and 240 may comprise a flexible material or a flexible end 40a or 240a to minimize damage to a seed that become trapped between the panel 40, 240 and the housing 12, 212 and, further to flex around the trapped seed thereby restricting passage of additional seeds. Where electric motors are used as actuating means 48, a spring may be associated with the actuating means 48 to allow full actuation and stop, even if a seed is trapped. Alternatively, the power in the motor could be controlled to determine the end of the motor's stroke.

An exemplary arrangement of actuation means 48 is illustrated in FIGS. 11 and 12. Situated between the gear motor and the panel for each embodiment is the connecting rod 50. Alternatively, the gear motor could be mounted on the side of the seed meter on and in operable communication with a shaft that is roughly perpendicular to the seed plate. The panel is mounted directly on the shaft, and the shaft is the hinge point for the hinge action of the panel. Other actuation means and configurations could be used. A pneumatic system could also be employed, whereby an air compressor, such as a 12 volt model, and solenoid valves are used to control an air cylinder. Moreover, it is contemplated that retrofitting certain models of existing meters 10 and 210 may be accomplished by removing a portion of the housing and certain parts and replacing all with a preformed, preassembled piece in the nature of a plug-n-play or snap-n-go assembly. As an example, the insert 219 shown on FIGS. 4, 7 and 8 and the associated brush 218 could be removed from the backside of the housing 13 and replaced with a new insert 219 upon which a panel 40, and actuation means 48 are pre-mounted.

Persons skilled in the art will appreciate that the disclosed apparatus may be used in an arrangement having multiple seed meters, and that each such apparatus may be individually and independently actuated. Hence, it would be possible to selectively control the dispensation of seed about a plurality of seed meters. For example, if an operator needs to selectively shut down rows at different locations in the field in order to compensate for less than square field boundaries the operator may move one or more panels into a closed position while leaving one or more panels in an open position. Once the obstacle or border is passed, or turned onto a new row, the operator may open closed meters.

The operator interface to the electronic control system could be configured in a number of different ways. One means for controlling the means for altering seed flow 40, 240 in each seed meter 10 could include the Ag Leader® Insight (AG LEADER TECHNOLOGY, INC., Ames, Iowa) or similar computer-controlled control systems. Preferably such a system would include a touch screen access in the cab of the machine pulling the planter. The system may be connected to a module mounted on the planter via a controller area network (or CAN) bus or similar control communications. The CAN is designed to allow microcontrollers and devices to communicate with each other within a vehicle without a host computer. The planter mounted module outputs simple on-off signals for each improved seed meter or group of seed meters. For example, seed meters on a sixteen row planter could be included in groups of two so that eight valves are necessary to control the sixteen rows. This simple on-off signal could be used signal a change in the position of panel 40, 240 via electric motor 48, 148. Circuitry with each motor would limit the motor position and current. An alternative method involves circuitry such that all of the current limiting would be controlled at the central module. The advantage of the alternative method with control at the central module is the comparative simplicity of each actuator.

A second alternative method includes control of each motor directly with the CAN bus, thereby eliminating the control module(s) altogether. This may be a better method especially on large planters. It will be appreciated that planters with 24 or more rows are very common.

When all of the electric motors actuate at once, a surge in current is needed albeit the necessity is short lived. Further, although solenoids could be employed as an alternative, the electric motor has the advantage in that it only uses power during the transition. By way of example, in a preferred embodiment, the time required to open or close panel 40, 240 (therefore, the time over which the electric motor uses power) would be less than 0.5 seconds.

A method of regulating the discharge of seed from a seed meter is also contemplated whereby the steps comprise providing a seed meter having a metering chamber, a seed reservoir disposed within said chamber, a metering device disposed within said chamber, a discharge chute in communication with said metering chamber via a passage, a means for altering seed flow and an actuating means operating said metering device; and operating said actuating means for selectably altering seed flow relative to said passage.

Thus, the present invention has been described in an illustrative manner. It is to be understood that the terminology that has been used is intended to be in the nature of words of description rather than of limitation. Furthermore, whereas the present invention has been described in relation to the drawings attached hereto, it should be understood that other and further modifications, apart from those shown or suggested herein, may be made within the spirit and scope of this invention. For example, the present invention is shown with seed meters achieving seed singulation through vacuum pressure, however the present invention could also be employed in seed meters where singulation is achieved through air pressure or mechanical means.

What we claim is:

1. A seed meter for use on a planter comprising:
   a metering chamber defined by a housing;
   a metering device disposed within said metering chamber which rotates;
   a passage in communication with said metering chamber to which said metering device delivers a plurality of seeds, said passage terminating in a discharge chute;
   means substantially within said housing for altering seed flow without stopping rotation of said metering device wherein said means for altering is actuated by actuating means whereby seeds are precluded from exiting the metering chamber entering the discharge chute.

2. The seed meter of claim 1 further comprising a seed reservoir containing said plurality of seeds disposed within said chamber.

3. The seed meter of claim 2 wherein said means for altering seed flow comprises said actuating means wherein upon actuation at least some of said plurality of seeds are returned to said seed reservoir.

4. The seed meter of claim 1 wherein said metering device comprises a seed plate.

5. The seed meter of claim 1 wherein said metering device comprises a seed plate having a plurality of circumferentially spaced pairs of openings wherein each said pair of openings includes a first opening generally radially aligned with a second opening.

6. The seed meter of claim 1 wherein said metering device is operated under a vacuum.

7. The seed meter of claim 1 wherein said means for altering seed flow comprises a movable panel and said actuating means wherein upon actuation said panel moves from a first position to a second position causing at least some of said plurality of seeds to be returned to said seed reservoir.

8. The seed meter of claim 1 further comprising:
   a cover;
   an internal wall;
   the metering chamber further defined by said cover and a first side of said internal wall;
   said metering device comprising a seed plate rotatably disposed within said chamber; and
   the passage defined by said housing, said cover and said internal wall;
   said internal wall comprising said means for altering seed flow comprising a panel whereby said panel pivots between a first position and a second position;
   said first position characterized by said panel forming a physical barrier between said chamber and said passage, and said second position characterized by said panel forming a physical barrier between said passage and said discharge chute.

9. The seed meter of claim 8 whereby upon actuation of said actuating means said panel pivots selectably between said first position and said second position.

10. The seed meter of claim 9 wherein said actuating means is a pneumatic device.

11. The seed meter of claim 9 wherein said actuation means is a solenoid.

12. The seed meter of claim 9 wherein said actuation means further comprises an anchor secured to said panel.

13. A method to control a plurality of seed meters of claim 1 wherein said method comprises:
   Providing an operator with an operator interface to an electronic control system;
   Connecting said electronic control system to a network allowing said operator interface and said means for actuating the means for altering seed flow of each said plurality of meters to communicate;
   Sending at least one signal from said operator interface to at least one of said actuating means of at least one of said plurality of seed meters.

14. A seed meter comprising:
   a metering chamber defined by a housing;
   a seed reservoir disposed within said chamber;
   a metering device rotatably disposed within said chamber, said metering device comprising a perimeter and a plurality of openings near said perimeter;
   a discharge chute in fluid communication with said metering chamber; and
   means substantially within said housing for altering seed flow to said discharge chute.

15. The seed meter of claim 14 wherein said means for altering seed flow to said discharge chute comprises a hinged panel and an actuating means.

16. The seed meter of claim 14 wherein said plurality of openings on the metering device comprise a plurality of generally radially spaced apart pairs of openings wherein each opening in each said pair is generally radially aligned with the other said opening.

17. The seed meter of claim 14 further comprising a control means for actuating said actuating means wherein said control means includes an operator interface associated with a computer.

* * * * *